INVENTOR.
WILLIAM S. WAGNER
BY Meyer, Tilberry & Body
ATTORNEYS

United States Patent Office 3,462,052
Patented Aug. 19, 1969

3,462,052
APPARATUS FOR REMOVING
COVERING MATERIAL
William S. Wagner, Navarre, Ohio, assignor to E. W. Bliss Company, Canton, Ohio, a corporation of Delaware
Filed Mar. 15, 1967, Ser. No. 623,306
Int. Cl. B26f 3/02; B65h 35/10
U.S. Cl. 225—2      5 Claims

ABSTRACT OF THE DISCLOSURE

The disclosure relates to a stripping device for removing an outer layer of material from one underneath without damage to the underneath layer. In a specific application of the invention for the manufacture of rubber hose, a lead sheath is extruded around the hose prior to its being vulcanized. After vulcanization, the lead encased hose is guided through the inventive stripping device which comprises a pair of rotary blades, each blade having its axis of rotation inclined toward the hose so that the peripheral edges of the blades continuously converge during rotation at a point of contact intermediate the lead sheathing and hose leaving a nexus in the scoring line. The axis of each blade furthermore lies in a common plane inclined sufficiently in the direction which the lead encased hose is moving to cause the blades to diverge beyond the point of contact to an extent causing the nexus to progressively tear and the sheath to separate from the hose.

---

While the present invention will be described in particular with reference to a device for stripping a lead sheath from around a rubber hose or cable, it will be appreciated that the invention has equal utility in other applications wherever it may be desirable to remove an outer covering or layer of material without scoring or marking an underneath layer.

Heretofore, lead encased power cables and rubber hoses have been stripped of their lead sheathing by means of a stripper incorporating fixed slitting knives which score the lead sheathing without actually parting it. In accordance with such practice, the slitting knives are disposed on opposite sides of the lead encased hose which is being pushed into the knives. A pair of wedges follow up the knives and drive into the scoring line created by the knives as the hose passes their location initially separating the lead sheath in two halves. Thereafter the wedges are withdrawn and actual parting of the sheath is accomplished by upper and lower corrugated rolls which grip the upper and lower sheath halves and tear the sheath along the scoring line. Upper and lower knife rollers process the lead sheath halves into chips which can be easily handled for remelting.

One difficulty with prior art apparatus is that the wedges do not always follow the scoring line of the knives. Moreover the wedges must be removed after each hose is started. Also the wedges give difficulty in starting inasmuch as lead encased hose of small diameter may buckle as it is pushed between the two wedges.

These and other difficulties are overcome with the present invention which provides rotary blades so arranged that they not only score the lead sheath but also separate it into upper and lower halves eliminating wedges entirely.

In accordance with the invention, a multilayered material having an outer layer which is to be stripped from an underneath layer is guided so as to encounter a pair of rotary blades. Relative movement of the material and blades longitudinally of each other causes the outer layer to be scored without marking the underneath layer by an arrangement in which each blade has its axis of rotation lying in an inclined plane relative to the longitudinal scoring direction and each axis is inclined toward the material causing the peripheral edges of the blades of continuously converge during rotation at a contact point below the surface of the upper layer and above the surface of the underneath layer, the blades progressively diverging after passing through the contact point at a sufficient angle to cause tearing of a membrane of the upper layer left in the scoring line and a physical separation of the two layers.

Accordingly the invention has as one of its objects an arrangement of rotary blades comprising at least two cutting members which converge beneath the surface of an outer layer which is to be peeled from one underneath and owing to the angle of attack, there is a tendency on the part of the blades to separate the outer layer by rolling it back on each side in the wake of the blades.

A further object of the invention is to provide apparatus for removing the lead sheathing on rubber hose or cable by scoring and parting the lead sheath without marking the hose underneath.

Still another object is to provide a lead stripper which incorporates among its features a pair of rotary blades and in which the stripping of the lead sheathing is accomplished without the use of wedges or the like.

These and other objects will be more apparent by referring to the following description and drawings wherein.

Figure 1:
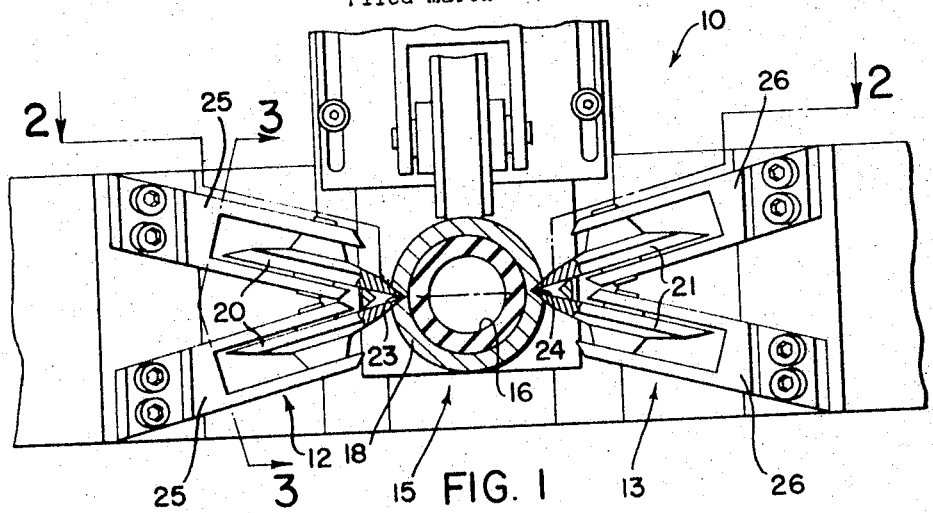
FIGURE 1 shows the rotary blades of a lead stripper as provided in accordance with a preferred embodiment of the invention.
Figure 2:
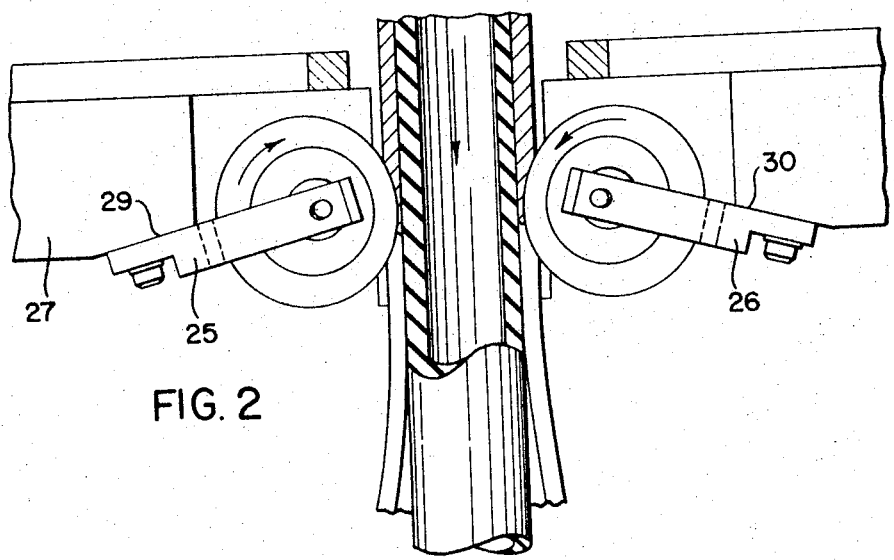
FIGURE 2 is a view of the lead stripper of FIGURE 1 taken along line 2—2 of FIGURE 1.

Referring now to the drawings wherein the showings are for the purpose of illustrating a preferred embodiment of the invention and not for the purpose of limiting same, FIGURES 1 and 2 show a lead stripper 10 equipped with two pair of rotary blades 12, 13 which can be advanced or retracted laterally to accommodate various thicknesses of lead encased hose or cable 15. It will be appreciated by those skilled in the art of manufacturing rubber hose and cable that in order to vulcanize the rubber hose 16 a lead sheath 18 approximately ⅛ inch thick is extruded around it prior to vulcanizing which is subsequently removed by the stripper 10. The stripper will have means for pushing the lead encased hose 15 between the pair of rotary blades 12, 13 and for turning a fully loaded hose reel from which it is being unwound.

In accordance with the invention, each pair of rotary blades 12, 13 comprises an upper and lower disc blade 20, 21, each of which has a rotational axis inclined toward the axis of hose 16 so that the edges of the blades 20, 21 converge at contact points 23, 24 on opposite sides of the hose.

Figure 3:
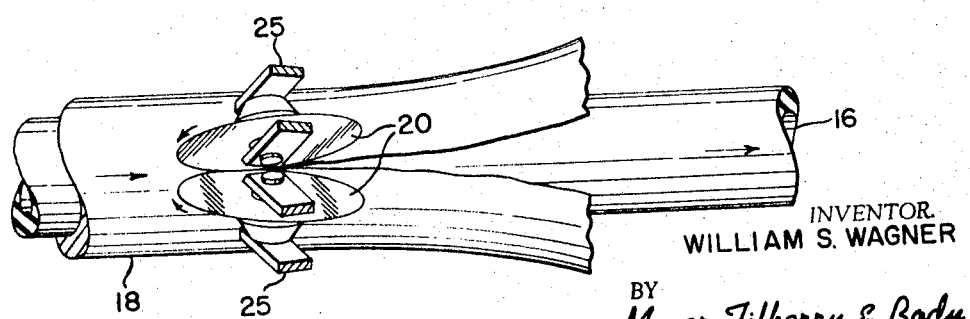
FIGURE 3 is a diagram depicting the scoring and parting action of the blades.

Moreover, the axis of each blade 20, 21 in each pair 12, 13 lies in a common plane inclined in the direction of material advanced as shown in FIGURE 2. Each blade 20, 21 is mounted in a blade support structure 25, 26 secured to a frame 27. The blade support structure 25, 26 can be adjusted on surfaces 29, 30 of the frame which are parallel to the planes containing the rotational axes of the blades. It is important to note that the pairs of blades 12, 13 are laterally adjusted toward and away from each other according to the diameter of the lead encased hose 15 which is to be processed and are spaced so that the contact points 23, 24 are below the surface of the lead sheathing 18 but above the surface of the hose 16 so as to leave a membrane or nexus 32 of lead in the scoring line approximately 1/32″ thick or less. The inclination of surfaces 29, 30 is such that the blades diverge beyond the contact points sufficiently to cause a tearing of the membrane 32 and a physical separation of the lead sheath from the hose in a progressive manner as depicted in FIGURES 2 and 3.

Thus the disc blades 20, 21 converge toward the contact points 23, 24 entering the lead sheathing 18 just ahead of the contact points and once passing through, diverge approximately at the bottom of their arcuate path. As the hose continues to move, the diverging action parts the lead sheathing into upper and lower halves which are physically separated from each other and the hose without marking the hose 16 underneath.

Having now described a preferred embodiment of the invention it will be appreciated to those skilled in the art that other modifications may be made without departing from the invention as defined in the appended claims.

Having thus described my invention, I claim.

1. A device for removing an outer layer of material from one underneath without damage to the underneath layer comprising
    a pair of rotary blades, each blade having its axis of rotation inclined at an angle sufficient that the peripheral edges of the blades continuously converge at a contact zone during relative movement of the material and blades longitudinally of each other and
    a blade support structure mounting each blade for rotation so as to encounter only the outer layer of material leaving a membrane in the scoring line,
    each blade rotational axis being contained in a plane inclined relative to the longitudinal direction of movement at an angle sufficient to cause a divergence beyond the contact zone effective for tearing of said membrane and progressive separation of the outer layer from the inner layer.

2. A device according to claim 1 in which the outer and underneath layers of material have cylindrical cross sections, one being concentric to the other and a pair of said rotary blades is positioned on opposite sides of the path of movement for separating said outer layer in two halves.

3. A device according to claim 2 wherein said membrane of outer layer of material is approximately $1/32$ inch thick or less.

4. A device according to claim 3 wherein the material is advanced and the pairs of rotary blades are stationary, each blade rotational axis being contained in a plane inclined in the direction of advance.

5. A method of removing an outer layer of material from an elongated member comprised of a plurality of longitudinally extending layers without damaging the next subjacent layer comprising the steps of:
    (a) providing a pair of rotary blades each having an axis of rotation;
    (b) positioning the blades adjacent each other with their axis of rotation in a common plane but inclined relative to one another and the outer peripheral edges of the blades converging at a contact zone;
    (c) bringing the contact zone of the blades into engagement with the member;
    (d) applying sufficient force to said blades to cause said contact zone to enter the outer layer of material to produce a score line of a depth sufficient to leave a thin membrane of said outer layer remaining between said contact zone and the next subjacent layer; and,
    (e) producing relative longitudinal movement between the blades and the member while inclining said plane containing the axis at an angle relative to the path of longitudinal movement to cause a divergence of said outer peripheries behind the contact zone effective for tearing of said membrane and progressive separation of the outer layer from the next subjacent layer.

References Cited

UNITED STATES PATENTS

| | | | |
|---|---|---|---|
| 362,179 | 5/1887 | Remus | 83—5 |
| Re. 13,043 | 11/1909 | Klein | 83—5 X |
| 1,805,688 | 5/1931 | Davis | 83—924 X |
| 1,941,364 | 12/1933 | Nunninghoff | 83—924 X |
| 2,457,540 | 12/1948 | Fasoldt | 30—90.9 |
| 2,894,868 | 7/1959 | Hyde | 81—9.51 X |
| 3,309,947 | 3/1967 | Denney | 81—9.51 |

FRANK T. YOST, Primary Examiner

U.S. Cl. X.R.

30—90.4; 81—9.51; 225—3, 96, 97